United States Patent
Brossard et al.

(10) Patent No.: US 11,726,976 B1
(45) Date of Patent: Aug. 15, 2023

(54) DATABASE ENCODING AND DECODING FOR DATABASE FUNCTIONS

(71) Applicant: Snowflake Inc., Bozeman, MT (US)

(72) Inventors: Elliott Brossard, Kirkland, WA (US); Chong Han, Bellevue, WA (US); Igor Zinkovsky, Redmond, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/060,085

(22) Filed: Nov. 30, 2022

Related U.S. Application Data

(60) Provisional application No. 63/366,282, filed on Jun. 13, 2022.

(51) Int. Cl.
*G06F 16/22* (2019.01)
*G06F 16/248* (2019.01)
*G06F 16/27* (2019.01)
*G06F 16/25* (2019.01)

(52) U.S. Cl.
CPC ........ *G06F 16/2291* (2019.01); *G06F 16/221* (2019.01); *G06F 16/248* (2019.01); *G06F 16/258* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 10,534,770 B2 * | 1/2020 | Chen | G06F 16/182 |
| 11,216,582 B2 * | 1/2022 | Lee | G06F 16/2282 |
| 11,361,026 B2 * | 6/2022 | Brassard | G06F 16/955 |
| 11,550,845 B2 * | 1/2023 | Brassard | G06F 16/24568 |
| 2017/0139931 A1 * | 5/2017 | Wang | H04L 67/1097 |
| 2017/0140064 A1 * | 5/2017 | Wang | G06F 16/27 |
| 2021/0406311 A1 * | 12/2021 | Brassard | G06F 16/2282 |
| 2022/0237231 A1 * | 7/2022 | Brassard | G06F 16/908 |
| 2023/0097756 A1 * | 3/2023 | Brassard | G06F 16/955 |
| | | | 707/741 |

OTHER PUBLICATIONS

"alipay / tensorflowjo", Dataset and Filesystem Extension [online]. Retrieved from the Internet: <URL: https://github.com/alipay/tensorflow_io/blob/master/tensorflow_io/arrow/kernels/arrow_stream_client_unix.cc>, (2022), 3 pgs.

"Datasets & Dataloaders", [online]. ©2023, PyTorch. Retrieved from the Internet: <URL: https://pytorch.org/tutorials/beginner/basics/data_tutorial.html>, (2023), 5 pgs.

"tfio.arrow.ArrowDataset", TensorFlow I/O Apache Arrow Dataset [online]. Retrieved from the Internet: <URL: https://www.tensorflow.org/io/api_docs/python/tfio/arrow/ArrowDataset>, (updated Feb. 15, 2022), 68 pgs.

\* cited by examiner

*Primary Examiner* — Kim T Nguyen
(74) *Attorney, Agent, or Firm* — Schwegman Lundberg & Woessner, P.A.

(57) ABSTRACT

A database query specifies a user-defined function (UDF) to apply to one or more tables in a distributed database. The one or more tables are identified in the distributed database. The one or more tables are associated with an initial set of data types native to the distributed database. The one or more tables are converted to database data comprising data types of the UDF. The UDF is executed on the database data to generate results data. The results data is converted to table results data. The table results data is associated with the initial set of data types. The table results data is stored in the distributed database.

30 Claims, 7 Drawing Sheets

DATABASE ENCODING AND DECODING FOR DATABASE FUNCTIONS

PRIORITY CLAIM

This application claims the benefit of priority to U.S. Provisional Patent Application 63/366,282, filed Jun. 13, 2022, and entitled "DATABASE ENCODING AND DECODING FOR DATABASE FUNCTIONS," which application is incorporated herein by reference in its entirety.

TECHNICAL FIELD

Embodiments of the disclosure relate generally to a network-based database system and, more specifically, to implementing database applications in a distributed database system, including database encoding and decoding for database functions.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Different database storage systems may be used for storing different types of content, such as bibliographic, full text, numeric, and/or image content. Further, in computing, different database systems may be classified according to the organizational approach of the database. There are many different types of databases, including relational databases, distributed databases, cloud databases, object-oriented and others.

A user application can be provided for execution on a database system. Various components and libraries that are used by the application can be difficult to manage within the operational environment of the database system. Further, the data format of the database data may not be congruent with the data format and programming language of different applications.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
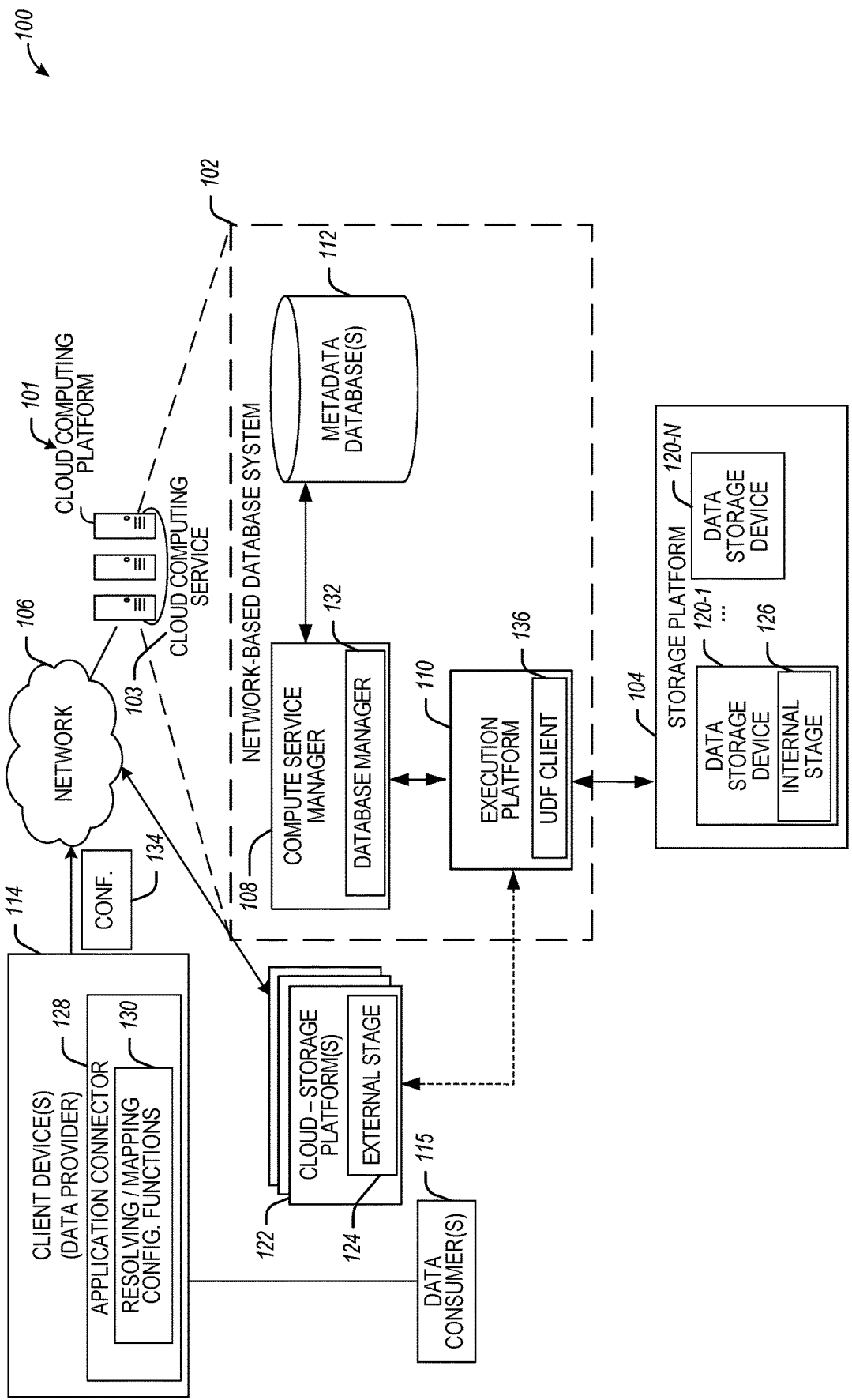
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform and that make up the content of, e.g., database tables in customer accounts are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a data platform may include one or more databases that are respectively maintained in association with any number of customer accounts (e.g., accounts of one or more data providers), as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata (e.g., account object metadata) in association with the data platform in general and in association with, for example, particular databases and/or particular customer accounts as well. Users and/or executing processes that are associated with a given customer account may, via one or more types of clients, be able to cause data to be ingested into the database, and may also be able to manipulate the data, add additional data, remove data, run queries against the data, generate views of the data, and so forth. As used herein, the terms "account object metadata" and "account object" are used interchangeably.

In an implementation of a data platform, a given database (e.g., a database maintained for a customer account) may reside as an object within, e.g., a customer account, which may also include one or more other objects (e.g., users, roles, grants, shares, warehouses, resource monitors, integrations, network policies, and/or the like). Furthermore, a given object such as a database may itself contain one or more objects such as schemas, tables, materialized views, and/or the like. A given table may be organized as a collection of records (e.g., rows) so that each includes a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

In computer security, a sandbox (e.g., sandbox environment) is a security mechanism for separating running programs, usually to prevent system failures or prevent exploitation of software vulnerabilities. A sandbox can be used to execute untested or untrusted programs or code, possibly from unverified or untrusted third parties, suppliers, users, or websites, without risking harm to the host machine or operating system. A sandbox can provide a tightly controlled set of resources for guest programs to run in, such as storage and memory scratch space. Network access, the ability to inspect the host system or read from input devices can be disallowed or restricted. UDFs typically can run in a sandbox environment.

As discussed, it can be difficult to implement different programming language environments in a distributed database. As an example, Python is a popular language for data science and machine learning. Python data science and machine learning applications can require different dependencies to function properly in a distributed database environment (e.g., virtual warehouses). One concern in implementing Python in a distributed database environment is dependency management. Dependencies include the software packages that are used by a given application (e.g., Python NumPy) that must be installed for the application to work as intended and avoid runtime errors. One approach is to require end-users to upload and manage all the required packages; however, this can be problematic because a given program language's versioning (e.g., Python versioning) can be unorganized and difficult to manage. Managing all the dependencies in this approach can result in negative development user experiences (e.g., extreme frustration encountered by end-users when installed software packages have dependencies on specific versions of other software packages). For instance, the dependency issue arises when several packages have dependencies on the same shared packages or libraries, but they depend on different and incompatible versions of the shared packages. If the shared package or library can only be installed in a single version, the user may need to address the problem by obtaining newer or older versions of the dependent packages. This, in turn, may break other dependencies and push the problem to another set of packages. Furthermore, requiring users to install and manage hundreds of packages is insecure, cumbersome, and error-prone. Another approach is to only integrate a small set of dependencies out of the box on the distributed database. However, this approach sets a hard limit on application functionality, and users will not be able to tap into the full Python ecosystem.

To address the foregoing issues, a database manager with a database dependency resolver system is implemented to create one or more execution environments that are configured for different types of dependencies (e.g., programming language versions, CPU requirements, etc.). The database dependency resolver system can include a dependency resolver engine that resolves different dependencies of a given programming language application that is provided by the end-user for execution in the distributed database. In some example embodiments, the dependency resolver engine generates a configuration file (e.g., a yaml file) that specifies which packages are to be installed for a given user application (e.g., a Python application). In some example embodiments, the database dependency resolver system includes a repository of packages (e.g., full Python packages repository) and once the different packages for a given application are resolved, the database dependency resolver system retrieves them from the repository and configures one or more execution environments. The execution environments are configured for different versions of the programming language (e.g., Python version 2.7 in a first environment and Python version 3.8 in a second environment), in accordance with some example embodiments. Additionally, different environments can be created to manage different CPU architectures to enable changing the CPU architecture of the execution environment (e.g., where the Python code runs) without breaking the user code. For example, if the application is Python NumPy, the system can initially provide an x86 build of NumPy for execution on an x86 environment and then later switch to an Arm build of NumPy for execution in an Arm environment without breaking the user code. In this way, end-users need only import an application specifying packages in the user code and need not complete any installation or upgrading of the packages. Further, a given end-user can activate multiple environments for the different dependencies from a single database statement. For example, a given user may have a UDF in their application that is written in Python 2.7 which cannot be upgraded to Python 3.8, but other UDFs are written in Python 3.8. In the disclosed approaches that implement the database dependency resolver system, the user does not manage the different packages nor install different versions. Instead, the user issues a database statement (e.g., a query) that causes execution of the different environments, such as, for example, a query "Select python_38_func (python_27_func( )" in which the results from the Python 2.7 UDF are passed to the Python 3.8 UDF.

In some aspects, the disclosed techniques can be used to configure Python functions where users (or customers) of a network-based database system can write functions using Python, and execute them directly inside the database system, without copying the data out of the database system first. The functions can be used directly to process data stored in tables. More specifically, the disclosed database manager can include a database mapping system which can include a mapping engine configured to automatically translate the data into Python data types before they are passed into Python functions for processing. The Python functions process the data and return results, which can be automatically translated by the mapping engine into a data format native to the network-based database system (also referred to as a native data format or a native file format). In some aspects, the mapping engine of the database mapping system can perform native data format to Python and Python to native data format data mapping (also referred to as translation).

Prior techniques for executing Python functions include initial copying of the data out of the database system, converting the data to Python data types (e.g., using Apache Spark), and then writing the results back to the database system for processing. By using the disclosed database manager configured with a database mapping system, users of the network-based database system can write Python logic that executes directly in the database system and processes data stored in tables in the database system using automatic data translation (e.g., performed by a mapping engine of the database mapping system). A more detailed description of the database manager using a database resolver system (e.g., with a resolver engine) and a database mapping system (e.g., with a mapping engine) is discussed in greater detail in connection with FIG. 2 and FIGS. 4-7.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g. SQL queries, analysis), as well as other processing capabilities (e.g., configuring replication group objects as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage). The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as remote computing device or user device 114) may include one or more of a laptop computer, a desktop computer, a mobile phone (e.g., a smartphone), a tablet computer, a cloud-hosted computer, cloud-hosted serverless processes, or other computing processes or devices may be used (e.g., by a data provider) to access services provided by the cloud computing platform 101 (e.g., cloud computing service 103) by way of a network 106, such as the Internet or a private network. A data consumer 115 can use another computing device to access the data of the data provider (e.g., data obtained via the client device 114).

In the description below, actions are ascribed to users, particularly consumers and providers. Such actions shall be understood to be performed concerning client device (or devices) 114 operated by such users. For example, a notification to a user may be understood to be a notification transmitted to client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some embodiments, the client device 114 is configured with an application connector 128, which may be configured to perform resolving/mapping configuration functions 130. For example, client device 114 can be associated with a data provider using the cloud computing service 103 of the network-based database system 102. In some embodiments, resolving/mapping configuration functions 130 include generating configurations 134 used for configuring resolving or mapping functionalities of the database manager 132. In some aspects, configurations 134 are used for configuring a database resolver system or a database mapping system used in connection with a UDF execution (e.g., execution of a Python UDF). In some aspects, the UDF execution can be configured using the UDF client 136 which is part of the execution platform 110.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

Figure 3:
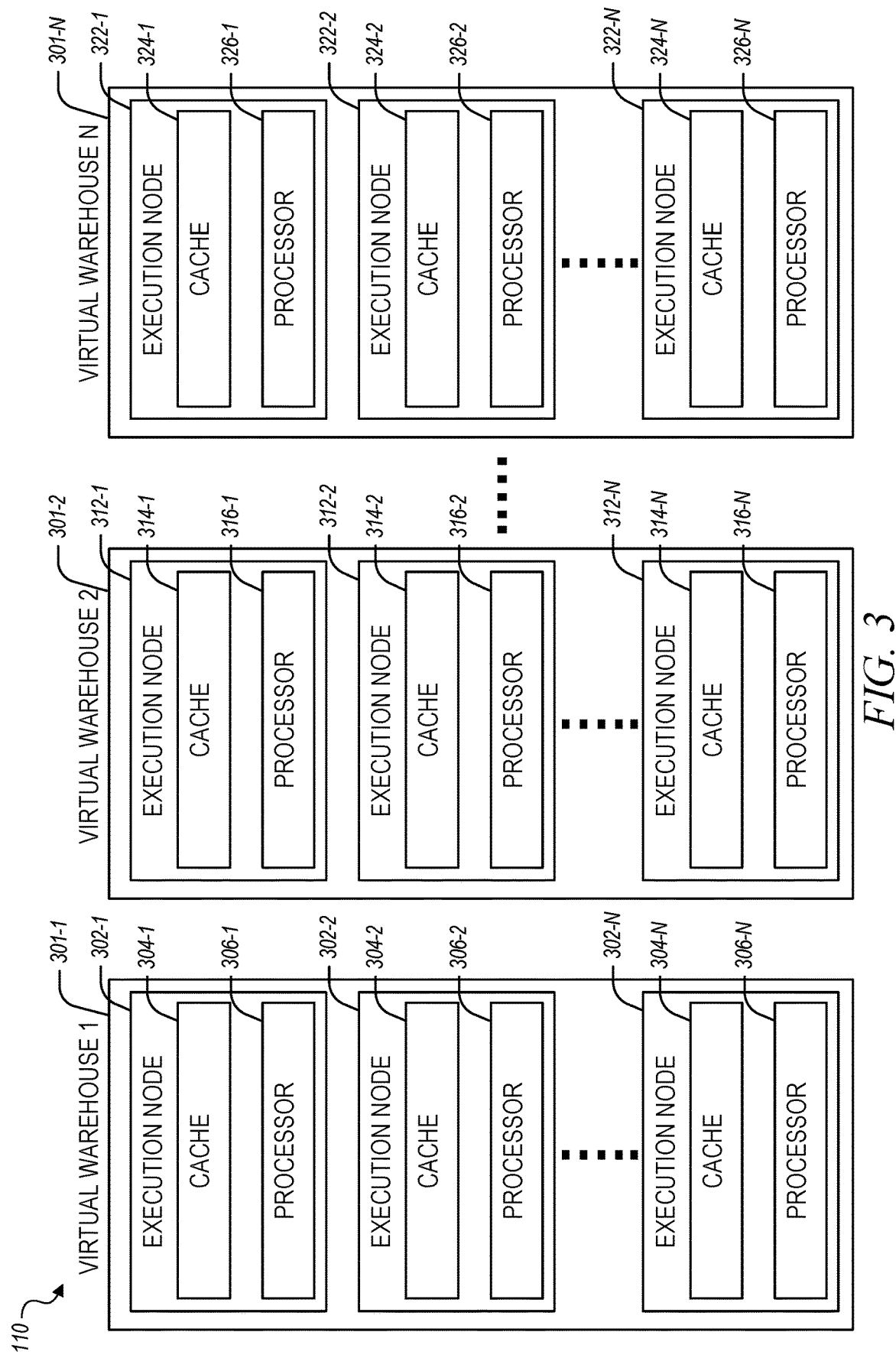
FIG. 3 is a block diagram illustrating components of an execution platform, in accordance with some embodiments of the present disclosure.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

Figure 2:
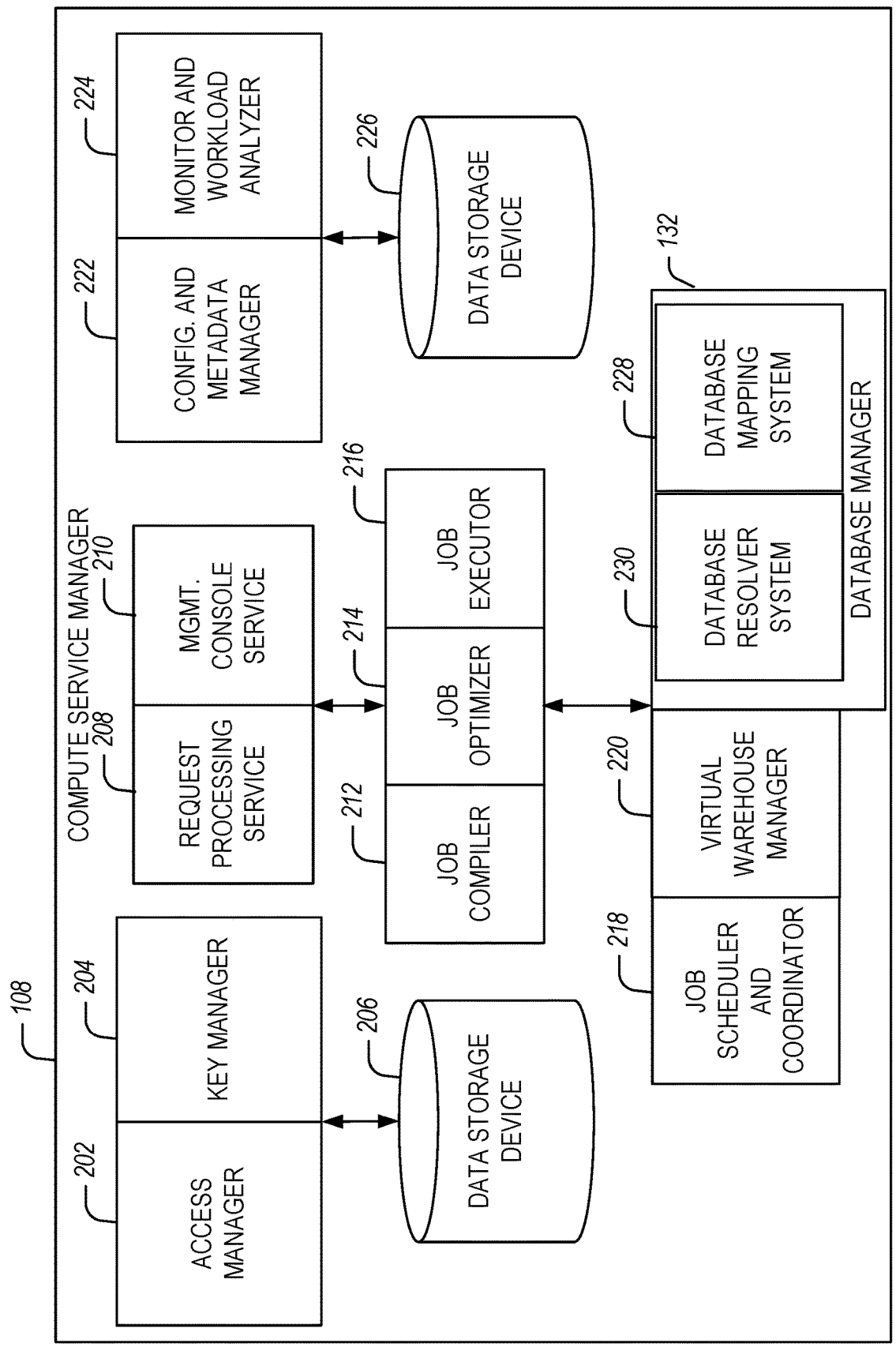
FIG. 2 is a block diagram illustrating components of a compute service manager, in accordance with some embodiments of the present disclosure.

In some embodiments, as mentioned above, the compute service manager 108 includes the database manager 132. The database manager 132 comprises suitable circuitry, interfaces, logic, and/or code and is configured to perform the disclosed resolving and mapping functionalities, which can be performed by a database resolver system and a database mapping system (e.g., as illustrated in FIG. 2). Additional functionalities associated with resolving and mapping configuration are discussed in connection with FIGS. 2 and 4-7.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During a typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 processes the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

FIG. 2 is a block diagram illustrating components of the compute service manager 108, in accordance with some embodiments of the present disclosure. As shown in FIG. 2, the compute service manager 108 includes an access manager 202 and a credential management system (or key manager) 204 coupled to a data storage device 206, which is an example of the metadata database(s) 112. Access manager 202 handles authentication and authorization tasks for the systems described herein. The key manager 204 facilitates the use of remotely stored credentials to access external resources such as data resources in a remote storage device. As used herein, the remote storage devices may also be referred to as "persistent storage devices" or "shared storage devices." For example, the key manager 204 may create and maintain remote credential store definitions and credential objects (e.g., in the data storage device 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the key manager 204 and access manager 202 use information stored in the data storage device 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

In some embodiments, the compute service manager 108 is configured with the database manager 132, which can include a database resolver system 230 (also referred to as a database dependency resolver system 230) and a database mapping system 228. The database dependency resolver system 230 is configured to manage database dependencies and environments for a given programming language from a user application, as discussed in further detail below. Additionally, the database mapping system 228 is configured to manage converting database data to and from application formats without the use of external processing clusters, such as Apache Spark. Although in FIG. 2 the database dependency resolver system 230 and the database mapping system 228 are illustrated in the compute service manager 108, in some example embodiments, instances of the database dependency resolver system 230 or the database mapping system 228 can be implemented on execution nodes (XP nodes), e.g., for concurrent processing of portions of a queried dataset that is serialized and deserialized and processed using an external network service, as discussed in further detail below. In some aspects, the database dependency resolver system 230 and the database mapping system 228 can be implemented in a single system such as the database manager 132. Additional functionalities performed by the database manager 132 are discussed in connection with at least FIGS. 4-7.

Additionally, the compute service manager 108 includes configuration and metadata manager 222, which manages the information related to the data stored in the remote data storage devices and the local buffers (e.g., the buffers in execution platform 110). Configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 (also referred to as virtual warehouse 301-1) includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 (also referred to as virtual warehouse 301-2) includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer useful.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
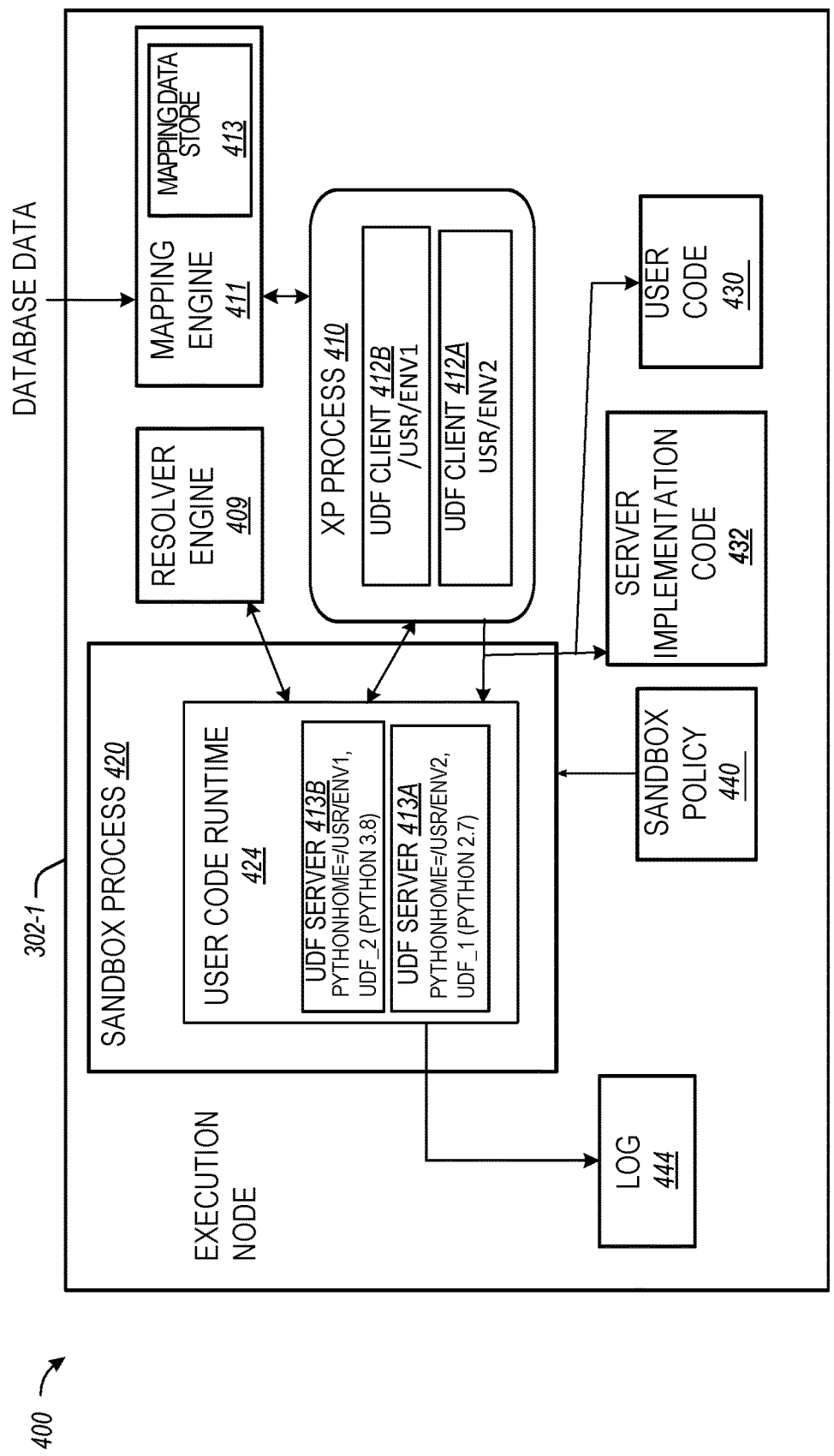
FIG. 4 is a computing environment conceptually illustrating an example software architecture executing user-defined functions (UDFs) in multiple environments on a given execution node of the execution platform, in accordance with some embodiments of the present disclosure.

FIG. 4 is a computing environment 400 conceptually illustrating an example software architecture executing a UDF by a process running on a given execution node of the execution platform 110, in accordance with some embodiments of the present disclosure.

As illustrated, the execution node 302-1 from the execution platform 110 includes an execution node process 410 (also referred to as XP process 410), which in an embodiment is running on the processor 306-1 and can also utilize memory from the cache 304-1 (or another memory device or storage). As mentioned herein, a "process" or "computing process" can refer to an instance of a computer program that is being executed by one or more threads by an execution node or execution platform.

As mentioned before, the compute service manager 108 validates all communication from the execution platform 110 to validate that the content and context of that communication are consistent with the task(s) known to be assigned to the execution platform 110. For example, the execution platform 110 executing a query A is not allowed to request access to a particular data source (e.g., data storage device 226 or any one of the storage devices in the cloud storage platform 104) that is not relevant to query A. In an example, the execution node 302-1 may need to communicate with a second execution node (e.g., execution node 302-2), but the security mechanisms described herein can disallow communication with a third execution node (e.g., execution node 312-1). Moreover, any such illicit communication can be recorded (e.g., in a log 444 or other location). Further, the information stored on a given execution node is restricted to data relevant to the current query and any other data is unusable by decryption or encryption where the key is unavailable.

A resolver engine 409 (e.g., pip and Conda) analyzes a user's application and pulls packages from a repository in a dependency system. The execution node process 410 is executing a UDF client, such as UDF client 412A or UDF client 412B, as illustrated in the example of FIG. 4. In some example embodiments, one or more clients or servers can be generated by the database resolver system 230 according to a user's application. For example, a user may have a UDF in their application that is written in Python 2.7 which they cannot upgrade to Python 3.8, but the rest of their UDFs are written in Python 3.8. In the improved approach that implements the disclosed database dependency resolver system, the user does not manage the different packages nor install different versions. Instead, the user can issue a database statement (e.g., query) that directly runs the different environments, such as a query "Select python_38_func (python_27_func( ).)." In some example embodiments, a Python 2.7 execution environment is configured in UDF server 413A and a Python 3.8 UDF execution environment is configured in UDF server 413B, and when the query is received, the results from the Python 2.7 UDF are passed to the Python 3.8 UDF, which then generates result data that is returned to the user.

User code 430 may be provided as a file that includes code for one or more UDFs. Server implementation code 432, in an embodiment, is a programming language file (e.g., a Python file, a Python ZIP archive, etc.) that initiates a server, which is responsible for receiving requests from the execution node process 410, assigning worker threads to execute user code, and returning the results, among other types of server tasks.

In an example embodiment, an operation from a UDF (e.g., a Python-based UDF) can be performed by a user code runtime 424 executing within a sandbox process 420 (e.g., UDF server processes, such as UDF server 413A or UDF server 413B). In an embodiment, the user code runtime 424 is implemented as a virtual machine. Since the user code runtime 424 executes in a separate process relative to the execution node process 410, there is a lower risk of manipulating the execution node process 410. Results of performing the operation, among other types of information or messages, can be stored in log 444 for review and retrieval. In an embodiment, the log 444 can be stored locally in memory at the execution node 302-1 or in a separate location such as the cloud storage platform 104. Moreover, such results can be returned from the user code runtime 424 to the UDF client (e.g., UDF client 412A, UDF client 412B) utilizing a high-performance protocol (e.g., without serialization or deserialization of data, without memory copies; operates on record batches without having to access individual columns, records or cells; utilizes efficient remote procedure call techniques and network protocol(s) for data transfer) for data transfer (e.g., distributed datasets) that further provides authentication and encryption of the data transfer. In an embodiment, the UDF client (e.g., UDF client 412A, UDF client 412B) uses a data transport mechanism that supports a network transfer of columnar data between the user code runtime 424 (and vice-versa).

Sandbox process 420, in an embodiment, is a sub-process (or a separate process) from the execution node process 410. A sub-process, in an embodiment, refers to a child process of a given parent process (e.g., in this example, the execution node process 410). The sandbox process 420, in an example, is a program that reduces the risk of security breaches by restricting the running environment of untrusted applications using security mechanisms such as namespaces and secure computing modes (e.g., using a system call filter to an executing process and all its descendants, thus reducing the attack surface of the kernel of a given operating system). Moreover, in an example, the sandbox process 420 is a lightweight process in comparison to the execution node process 410 and is optimized (e.g., closely coupled to security mechanisms of a given operating system kernel) to process a database query securely within the sandbox environment.

In an embodiment, the sandbox process 420 can utilize a virtual network connection to communicate with other components within the subject system. A specific set of rules can be configured for the virtual network connection with respect to other components of the subject system. For example, such rules for the virtual network connection can be configured for a particular UDF to restrict the locations (e.g., particular sites on the Internet or components that the UDF can communicate) that are accessible by operations performed by the UDF. Thus, in this example, the UDF can be denied access to particular network locations or sites on the Internet.

The sandbox process 420 can be understood as providing a constrained computing environment for a process (or processes) within the sandbox, where these constrained processes can be controlled and restricted to limit access to certain computing resources.

Examples of security mechanisms can include the implementation of namespaces in which each respective group of processes executing within the sandbox environment has access to respective computing resources (e.g., process IDs, hostnames, user IDs, file names, names associated with network access, and inter-process communication) that are not accessible to another group of processes (which may have access to a different group of resources not accessible by the former group of processes), other container implementations, and the like. By having the sandbox process 420 execute as a sub-process to the execution node process 410, in some embodiments, latency in processing a given database query can be substantially reduced (e.g., a reduction in latency by a factor of 10× in some instances) in comparison with other techniques that may utilize a virtual machine solution by itself.

As further illustrated, the sandbox process 420 can utilize a sandbox policy 440 to enforce a given security policy. The sandbox policy 440 can be a file with information related to a configuration of the sandbox process 420 and details regarding restrictions if any, and permissions for accessing and utilizing system resources. Example restrictions can include restrictions to network access or file system access (e.g., remapping file system to place files in different locations that may not be accessible, other files can be mounted in different locations, and the like). The sandbox process 420 restricts the memory and processor (e.g., CPU) usage of the user code runtime 424, ensuring that other operations on the same execution node can execute without running out of resources.

As mentioned above, the sandbox process 420 is a sub-process (or separate process) from the execution node process 410, which in practice means that the sandbox process 420 resides in a separate memory space from the execution node process 410. In an occurrence of a security breach in connection with the sandbox process 420 (e.g., by errant or malicious code from a given UDF), if arbitrary memory is accessed by a malicious actor, the data or information stored by the execution node process is protected.

Although the above discussion of FIG. 4 describes components that are implemented using a given programming language (e.g., an object-oriented programming language), it is appreciated that the other programming languages (e.g., interpreted programming languages) are supported by the computing environment 400. In an embodiment, PYTHON is supported for implementing and executing UDFs in the computing environment 400. In this example, the user code runtime 424 can be replaced with a PYTHON interpreter for executing operations from UDFs (e.g., written in PYTHON) within the sandbox process 420.

FIG. 4 further illustrates a mapping engine 411 which runs on the execution nodes (e.g., as a cluster, in parallel) to perform mapping operations in concert with the database mapping system 228, in accordance with some example embodiments. In some aspects, the network-based database system 102 implements Python programming language functions such that database users can write functions using the Python programming language, and execute the functions directly inside the network-based database system 102, without copying the data outside of the network-based database system 102 first. The Python functions written by the end-users can be used directly to process customer data (e.g., data in tables of a provider account, or consumer account, of the network-based database system 102) that are stored in tables of the network-based database system 102. The data in these tables is automatically translated into Python data types before they are passed into the Python functions for processing, in accordance with some example embodiments. Python functions process the data and generate results data which is automatically returned and is automatically translated into a native file format of the network-based database system 102.

In some example embodiments, the database mapping system 228 is configured to convert the native distributed database format of the network-based database system 102 into a Python format, and further convert the Python format into the native file format of the network-based database system 102 using translation and mapping. In contrast to previous approaches (e.g., in which customers would first need to copy their data out of the network-based database system 102, then do the processing using an external system, such as Apache Spark, followed by writing the results back to the network-based database system 102), the database mapping system 228 can provide Python functionality directly, in an efficient and streamlined manner with low computational overhead. In this way, by implementing automatic Python data encoding and translation, users of the database system 102 can generate custom Python logic and functions that execute directly in the database system 102 and processes data stored in tables of the database system 102. Although Python is discussed in the examples provided herein, it is appreciated that other programming languages and formats can likewise be implemented using the resolver system 230 and the mapping system 228 for local execution of end-user authored applications (e.g., user-defined functions) on database data without exporting the database data for format conversion.

In some example embodiments, the network-based database system 102 is configured to support the following SQL data types (which can be associated with the native file format) for storing data:

(a) numeric data types such as:
(a.1) NUMBER (default precision and scale are [38,0]);
(a.2) DECIMAL, NUMERIC (synonymous with NUMBER);
(a.3) INT, INTEGER, BIGINT, SMALLINT, TINYINT, BYTEINT (synonymous with NUMBER except precision and scale may not be specified);
(a.4) FLOAT, FLOAT4, FLOAT8;
(a.5) DOUBLE, DOUBLE PRECISION, REAL (synonymous with FLOAT);
(b) string and binary data types such as:
(b.1) VARCHAR (default and maximum is 16,777,216 bytes);
(b.2) CHAR, CHARACTER (synonymous with VARCHAR except default length is VARCHAR);
(b.3) STRING (synonymous with VARCHAR);
(b.4) TEXT (synonymous with VARCHAR);
(b.5) BINARY;
(b.6) VARBINARY (synonymous with BINARY);
(c) logical data types such as BOOLEAN;
(d) date and time data types such as:
(d.1) DATE;
(d.2) DATETIME (alias for TIMESTAMP_NTZ);
(d.3) TIME;
(d.4) TIMESTAMP (alias for one of the TIMESTAMP variations listed below);
(d.5) TIMESTAMP_LTZ (TIMESTAMP with a local time zone);
(d.6) TIMESTAMP_NTZ (TIMESTAMP with no time zone);
(d.7) TIMESTAMP_TZ (TIMESTAMP with time zone);
(e) semi-structured data types such as:
(e.1) VARIANT;
(e.2) OBJECT;
(e.3) ARRAY; and
(f) geospatial data types such as GEOGRAPHY.

In some example embodiments, the database mapping system 228 implements data mapping between the SQL data types of the network-based database system 102 and the Python data types implemented by the Python functions generated by users of the database system 102. In some aspects, the database mapping system 228 includes a mapping engine (e.g., mapping engine 411 in FIG. 4) which uses a mapping data store (e.g., mapping data store 413 in FIG. 4) to perform mapping functionalities. In some aspects, the mapping engine 411 and the mapping data store 413 are implemented separately from (and still being controlled by) the database mapping system 228 (e.g., as illustrated in FIG. 4). However, the disclosure is not limited in this regard and the mapping engine 411 and the mapping data store 413 are implemented as part of the database mapping system 228.

As an example of the mapping data store (e.g., mapping data store 413) implemented by the database mapping system 228, the following mapping configuration may be used (e.g., by the mapping engine 411 of FIG. 4):

(a) the SQL data type "NUMBER" can map to the Python data type "int" or "decimal.Decimal" (if the scale of the NUMBER type is 0 then the int Python type can be used, otherwise decimal.Decimal type is used);
(b) the SQL data type "FLOAT" can map to the Python data type "float";
(c) the SQL data type "VARCHAR" can map to the Python data type "str";
(d) the SQL data type "BINARY" can map to the Python data type "bytes";
(e) the SQL data type "BOOLEAN" can map to the Python data type "bool";
(f) the SQL data type "DATE" can map to the Python data type "datetime. date";
(g) the SQL data type "TIME" can map to the Python data type "datetime.time";
(h) the SQL data types "TIMESTAMP_LTZ", "TIMESTAMP_NTZ", and "TIMESTAMP_TZ" can map to the Python data type "datetime.datetime";
(i) the SQL data type "VARIANT" can map to the Python data types "dict", "list", "int", "float", "str", or "bool";
(j) the SQL data type "OBJECT" can map to the Python data type "dict";
(k) the SQL data type "ARRAY" can map to the Python data type "list";

and (l) the SQL data type "GEOGRAPHY" can map to the Python data type "dict".

In some aspects associated with the mapping of SQL data type "VARIANT", each variant row is parsed and passed to Python as a specific type using json.loads. In some aspects, SQL NULL vs. JSON null values are distinguished as follows: None is translated into JSON NULL; and a Python object, with "is_sql_null" attribute set to true, is translated into SQL NULL.

In some aspects, the above mappings can be augmented in the mapping data store of the database mapping system 228 to complete the functionality of the end user-generated Python functions. In some aspects, the mappings can apply to both the arguments passed to the Python UDF and the values returned from the UDF.

In some example embodiments, each mapping is associated with conversion cases to ensure the conversion succeeds. Example conversion cases include:

(a) an SQL NUMBER to the Python data type mapping is conditioned on the following condition: if the scale of the NUMBER type is 0 then NUMBER is mapped to int Python type, otherwise decimal.Decimal is used.

(b) an SQL OBJECT is converted to Python "dict" (dictionary type), where the "dict" is formatted using JSON.

(c) Floating point operations (e.g., mapping of SQL FLOAT) can have small rounding errors, which can accumulate when aggregate functions process large numbers of rows. Rounding errors can vary each time a query is executed if the rows are processed in a different order.

(d) About SQL TIME mapping, time values can be stored with nanosecond precision. However, the Python datetime.time type maintains only millisecond precision. Therefore, conversion between SQL TIME and Python data types can reduce effective precision to milliseconds.

(e) Each SQL VARIANT row can be converted to a Python type dynamically for arguments and vice versa for return values. The following types can be converted to strings rather than native Python types: DECIMAL, BINARY, DATE, TIME, TIMESTAMP_LTZ, TIMESTAMP_NTZ, and TIMESTAMP_TZ.

In some aspects, a Python UDF can be largely isolated from the environment in which it is called. However, TIMEZONE can be inherited from the calling environment. If the caller's session set a default TIMEZONE before calling the Python UDF, then the Python UDF has the same default time zone.

In some aspects, for the above-listed SQL data types, a SQL NULL argument to a Python UDF translates to the Python "None" value, and a returned Python "None" value translates back to the SQL NULL data type. In some aspects, a variant type value can be SQL NULL or a VARIANT JSON null. In some aspects, a VARIANT JSON null is translated to Python "None", and a SQL NULL is translated to a Python object, which has the is_sql_null attribute.

In some aspects, the data mapping described above and performed by the database mapping system 228 (e.g., using the mapping engine 411) can be configured to work on a row-by-row basis, where columns of the network-based database system 102 in each row are converted into Python values. A Python function handler can be called (e.g., a Python UDF), and the resulting Python values are converted into columns of the native data format (e.g., using the mapping data store 413 of the mapping engine 411).

In some aspects, the database mapping system 228 is configured to support vectorized/batch interfaces as discussed herein below. More specifically, rather than processing data on a row-by-row basis, the database mapping system 228 processes data in batches, which provides performance optimizations for certain scenarios. An example of a scenario in which a significant optimization is achieved includes implementing data science and machine learning models on the database data (models having millions of rows for training, processing, and scoring, which perform slowly when processed by row, and not batch). The vectorized/batch interface can use different data encoding, which translates batches of rows/columns from the native data format (e.g., one or more of the SQL data types) into one or more data frames (e.g., two-dimensional, size mutable, heterogeneous tabular data, such as Panda data frames). In some example embodiments, after the Python function is executed to process the data, the Python function generates a data frame array or series, which is automatically encoded into a batch of rows in the native format of the network-based database system 102.

In some aspects, the database mapping system 228 is configured to support semi-structured data, such as data represented in the network-based database system 102 as the OBJECT, ARRAY, and VARIANT data types, and unstructured data (e.g., various files in various unknown formats).

In some example embodiments, to create a Python UDF that uses a batch API, the database mapping system 228 implements a vectorized decorator for annotating the handler function. In some aspects, the decorator module is exposed to Python UDFs that execute within the database system 102. For example, in the Python code, the decorator module is imported, and the vectorized decorator is used to specify that the handler expects to receive a Pandas data frame by setting the input parameter to ".DataFrame." An example of the decorator use includes the following code listed in Table 1 below:

TABLE 1

```
create function add_one_to_inputs(x number(10, 0), y number(10, 0))
returns number(10, 0)
language python
runtime_version = 3.8
packages = ('pandas')
handler = 'add_one_to_inputs'
as $$
import pandas
from _database import vectorized
@vectorized(input=pandas.DataFrame)
def add_one_to_inputs(df):
return df[0] + df[1] + 1
$$;
```

In some aspects associated with using a function attribute, rather than importing the decorator module and using the vectorized decorator, the special sf vectorized input attribute can be set on the handler function to indicate desired use of the batch API.

In some example embodiments associated with setting a target batch size, calls to the Python handler function that implement the batch API must execute within a time limit (e.g., 60 seconds). In some aspects, each data frame passed as input to the handler function may contain up to a few thousand rows. To stay within the time limit, the target batch size for the handler function can be set accordingly, which can impose a maximum number of rows per input data frame. In some aspects, setting a larger value may not guarantee that the database system 102 will encode batches with the specified number of rows. In some aspects, the target batch size can be set using either the vectorized decorator or an attribute on the function.

To set the target batch size using the vectorized decorator, a positive integer value can be passed for the argument named max_batch_size. As an example, the following code statement listed in Table 2 creates a Python UDF that uses the batch API and limits each data frame to a maximum of 100 rows:

TABLE 2

```
create function add_one_to_inputs(x number(10, 0), y number(10, 0))
returns number(10, 0)
language python
runtime_version = 3.8
packages = ('pandas')
handler = 'add_one_to_inputs'
as $$
import pandas
from _database import vectorized
@vectorized(input=pandas.DataFrame, max_batch_size=100)
def add_one_to_inputs(df):
    return df[0] + df[1] + 1
$$;
```

To set the target batch size using a function attribute, a positive integer value can be set for the_sf_max_batch_size attribute on the handler function. As an example, the following code statement listed in Table 3 creates a Python UDF that uses the batch API and limits each data frame to a maximum of 100 rows:

TABLE 3

```
create function add_one_to_inputs(x number(10, 0), y number(10, 0))
returns number(10, 0)
language python
runtime_version = 3.8
packages = ('pandas')
handler = 'add_one_to_inputs'
as $$
import pandas
def add_one_to_inputs(df):
    return df[0] + df[1] + 1
add_one_to_inputs._sf_vectorized_input = pandas.DataFrame
add_one_to_inputs._sf_max_batch_size = 100
$$;
```

In some aspects associated with data frame encoding, batches of arguments to the UDF are encoded as arrays in the input data frames (e.g., Pandas data frames), and the number of rows in each data frame may vary. In some aspects, arguments can be accessed in the data frame by their index, i.e., the first argument has an index of 0, the second has an index of 1, and so on. The Pandas array or series that the UDF handler returns may have the same length as that of the input data frame. In some aspects, a Python UDF can be defined using the batch API configured using the code listed in Table 4:

TABLE 4

```
create or replace function add_inputs(x int, y float) returns float
language python
runtime_version = 3.8
packages = ('pandas')
handler = 'add_inputs'
as $$
```

TABLE 4-continued

```
import pandas
from _database import vectorized
@vectorized(input=pandas.DataFrame)
def add_inputs(df):
    return df[0] + df[1]
$$;
```

In the above example, the UDF uses df[0] to access the Pandas array for the first argument, and df[1] for the second. df[0]+df[1] results in a Pandas array with the pairwise sums of corresponding elements from the two arrays. After creating the UDF, a call via select can be performed with some input rows, which then generates an output as provided by the code listed in Table 5:

TABLE 5

```
Input:
select add_inputs(x, y) from (
select 1 as x, 3.14::float as y union all
select 2, 1.59 union all
select 3, -0.5
);
Output:
+-----+ | ADD_INPUTS(X, Y) | +-----+
4.14
3.59
2.5
+-------------------------------------+
```

In some embodiments, the batch API supports the following SQL types for arguments and return values (the list below reflects how each SQL argument is encoded as a Pandas array of a particular dtype):

(a) SQL argument NUMBER is encoded as Int16, Int32, or Int64 for NUMBER arguments with a scale of 0 that all fit in a 64-bit or smaller integer type. If the argument is not nullable, int16, int32, or int64 is used instead. Pandas array object is used for arguments with a scale other than 0, or for arguments that do not fit within a 64-bit integer, where array elements are encoded as decimal.Decimal values. To ensure a 16-bit dtype, a maximum NUMBER precision of 4 can be used. To ensure a 32-bit dtype, a maximum NUMBER precision of 9 can be used. To ensure a 64-bit dtype, a maximum NUMBER precision of 18 can be used.

(b) SQL argument FLOAT is encoded as a Pandas array of dtype float64.

(c) SQL argument BOOLEAN is encoded as a Pandas array of dtype Boolean for nullable arguments, or bool for non-nullable arguments.

(d) SQL argument VARCHAR is encoded as a Pandas array of dtype string.

(e) SQL argument BINARY is encoded as a Pandas array of dtype bytes.

(f) SQL argument DATE is encoded as a Pandas array of dtype datetime64.

(g) SQL argument VARIANT is encoded as a Pandas array of dtype object. Each value can be encoded as a dict, list, int, float, str, or bool.

(h) SQL argument OBJECT is encoded as a Pandas array of dtype object.

(i) SQL argument ARRAY is encoded as a Pandas array of dtype object.

(j) SQL argument TIME is encoded as a Pandas array of dtype timedelta64.

(k) SQL argument TIMESTAMP_LTZ is encoded as a Pandas array of dtype timedelta64.

(l) SQL argument TIMESTAMP_NTZ is encoded as a Pandas array of dtype timedelta64.

(m) SQL argument TIMESTAMP_TZ is encoded as a Pandas array of dtype object.

(n) SQL argument GEOGRAPHY is encoded as a Pandas array of dtype object.

Figure 5:
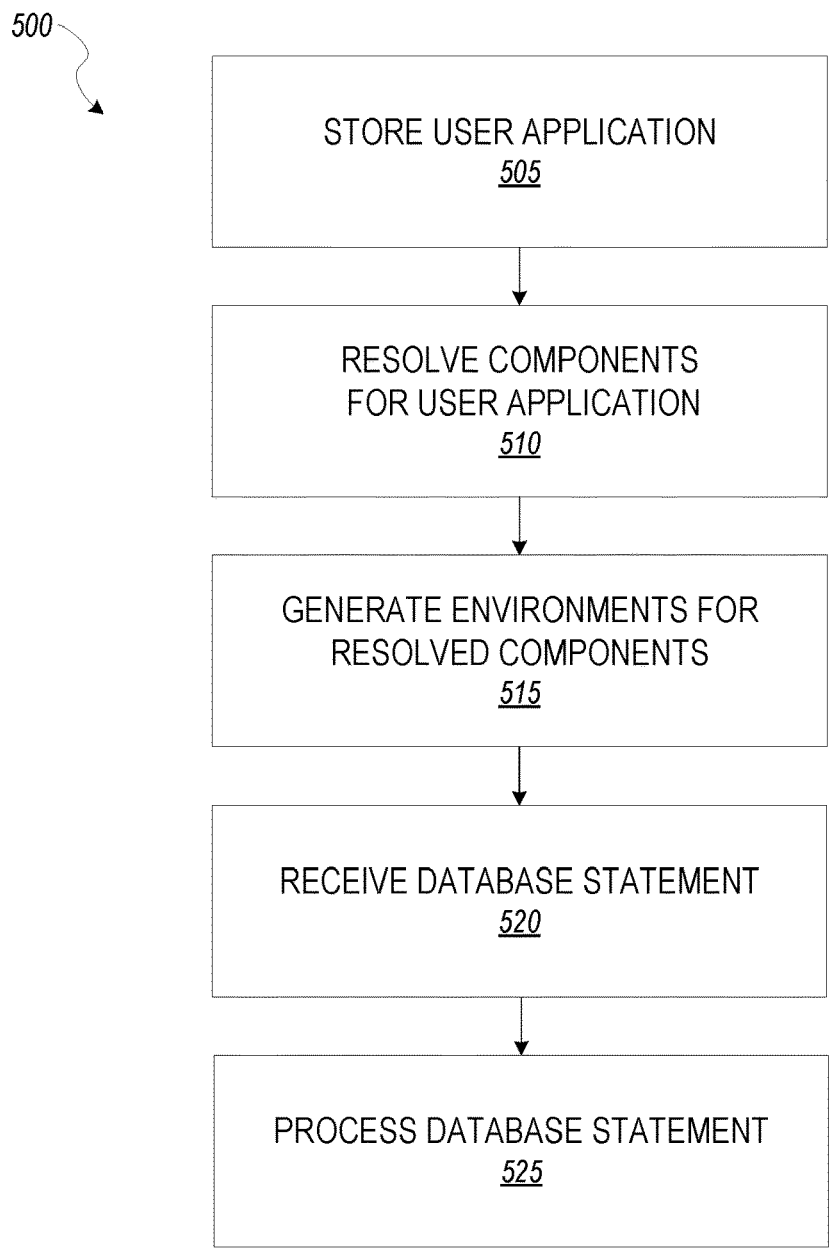
FIG. 5 shows a flow diagram of a method of implementing UDFs in multiple environments on a distributed database, in accordance with some embodiments of the present disclosure.

FIG. 5 shows a flow diagram of method 500 of implementing UDFs in multiple environments on a distributed database, in accordance with some embodiments of the present disclosure. At operation 505, the database dependency resolver system 230 stores a user application (e.g., a Python application uploaded by a database user). At operation 510, the resolver engine 409 determines which dependencies the user application uses to function, such as packages, Python versions, and/or libraries. At operation 515, the database dependency resolver system 230 generates execution environments for the resolved components of the application (e.g., UDF client 412A, UDF client 412B, UDF server 413A, UDF server 413B). At operation 520, the network-based database system 102 receives a query from an end-user operation of the client device 114 (e.g., "Select python_38_func(python_27_func( )," or "Select UDF_1, UDF_2" where UDF_1 is resolved as a Python version 2.7 UDF and UDF_2 is resolved as a Python version 3.8 UDF). At operation 525, the database dependency resolver system 230 processes the received database statement to generate results data (e.g., using the execution environment and packages generated at operation 515).

Figure 6:
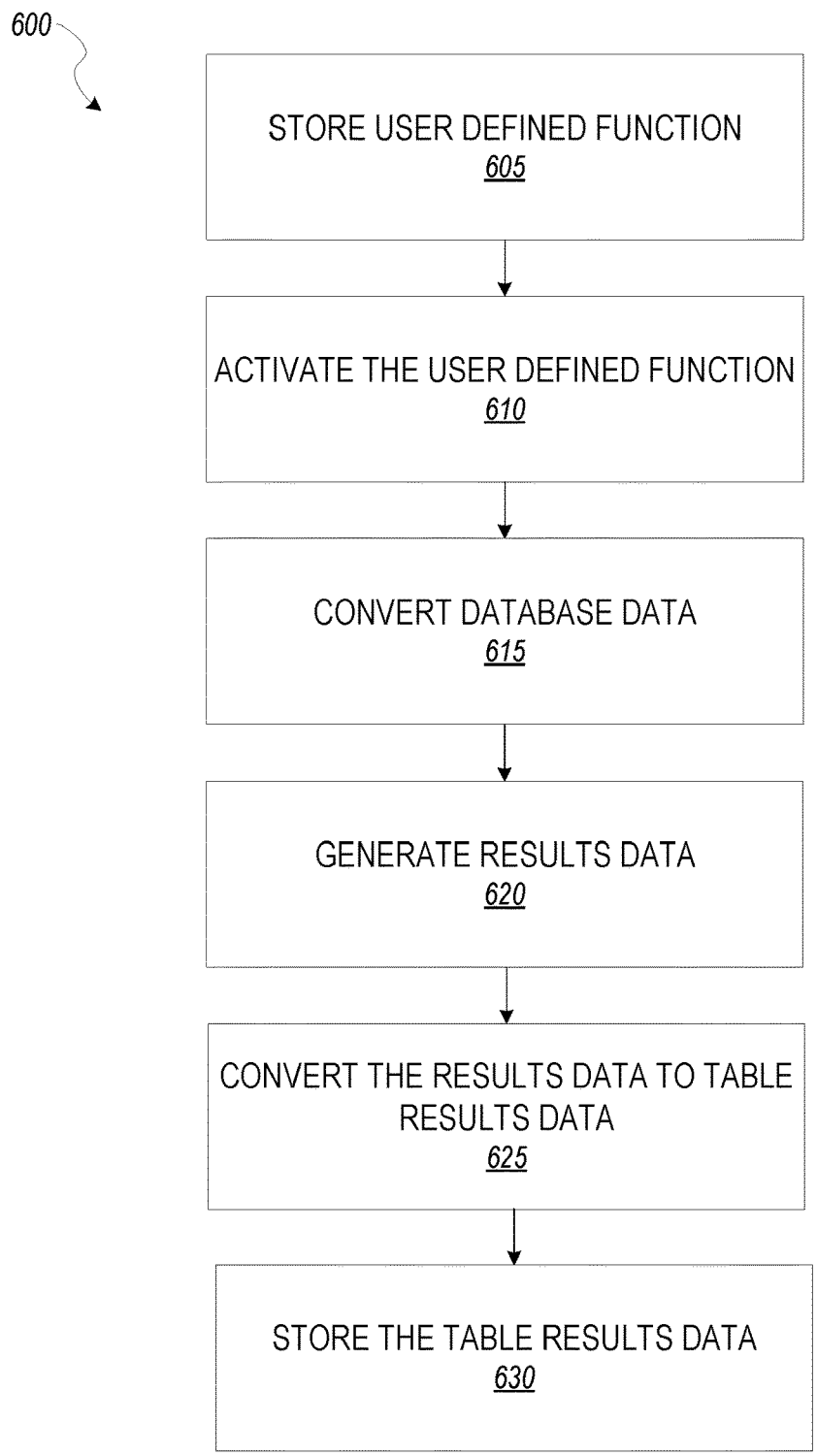
FIG. 6 shows a flow diagram of a method of implementing UDFs on database data using encoding and decoding of database data, in accordance with some embodiments of the present disclosure.

FIG. 6 shows a flow diagram of method 600 of implementing user-defined functions on database data using encoding and decoding of database data, in accordance with some embodiments of the present disclosure. At operation 605, the database mapping system 228 stores one or more user-defined functions (e.g., Python UDF comprising a machine learning model to train and score on data in the distributed database system 102). At operation 610, the database mapping system 228 activates one of the stored UDFs (e.g., as specified in a received query having a call to the UDF). For example, the database mapping system 228 receives a database query specifying the UDF to apply on one or more tables in a distributed database. Database mapping system 228 further identifies the one or more tables in the distributed database. The one or more tables are associated with an initial set of data types native to the distributed database.

At operation 615, the database mapping system 228 converts the database data to datatypes of the UDF. For example, the database mapping system 228 converts the one or more tables to database data comprising data types of the UDF.

At operation 620, the database mapping system 228 applies the specified UDF to the converted data to generate results data. For example, the database mapping system 228 executes, on the distributed database, the UDF on the database data to generate results data.

At operation 625, the database mapping system 228 converts the results data to datatypes of the network-based distributed database system 102. For example, the database mapping system 228 converts the results data to table results data. The table results data is associated with the initial set of data types.

At operation 630, the converted results data is stored. For example, the database mapping system 228 stores the table results data in the distributed database.

Figure 7:
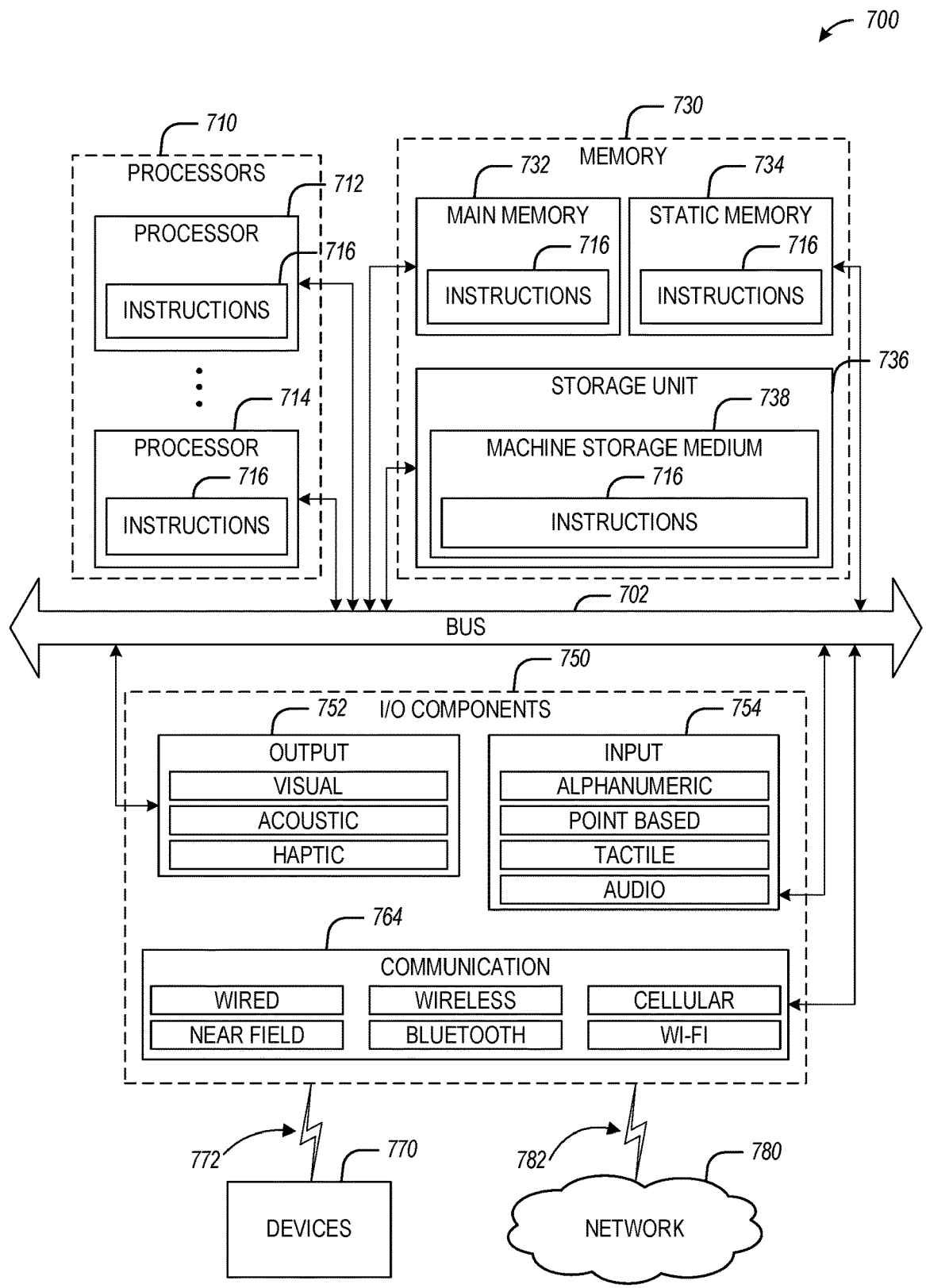
FIG. 7 illustrates a diagrammatic representation of a machine in the form of a computer system within which a set of instructions may be executed for causing the machine to perform any one or more of the methodologies discussed herein, in accordance with some embodiments of the present disclosure.

FIG. 7 illustrates a diagrammatic representation of machine 700 in the form of a computer system within which a set of instructions may be executed for causing machine 700 to perform any one or more of the methodologies discussed herein, according to an example embodiment. Specifically, FIG. 7 shows a diagrammatic representation of machine 700 in the example form of a computer system, within which instructions 716 (e.g., software, a program, an application, an applet, an app, or other executable code) for causing machine 700 to perform any one or more of the methodologies discussed herein may be executed. For example, instructions 716 may cause machine 700 to execute any one or more operations of method 600 (or any other technique discussed herein, for example in connection with FIG. 4-FIG. 6). As another example, instructions 716 may cause machine 700 to implement one or more portions of the functionalities discussed herein. In this way, instructions 716 may transform a general, non-programmed machine into a particular machine 700 (e.g., the client device 114, the compute service manager 108, or a node in the execution platform 110) that is specially configured to carry out any one of the described and illustrated functions in the manner described herein. In yet another embodiment, instructions 716 may configure the client device 114, the compute service manager 108, and/or a node in the execution platform 110 to carry out any one of the described and illustrated functions in the manner described herein.

In alternative embodiments, the machine 700 operates as a standalone device or may be coupled (e.g., networked) to other machines. In a networked deployment, machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute instructions 716 to perform any one or more of the methodologies discussed herein.

Machine 700 includes processors 710, memory 730, and input/output (I/O) components 750 configured to communicate with each other such as via a bus 702. In some example embodiments, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, all accessible to the processors 710 such as via bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within machine storage medium 738 of the storage unit 736, within at least one of the processors 710 (e.g., within the processor's cache memory), or any suitable combination thereof, during execution thereof by the machine 700.

The I/O components 750 include components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, communication components 764 may include a network interface component or another suitable device to interface with network 780. In further examples, communication components 764 may include wired communication components, wireless communication components, cellular communication components, and other communication components to provide communication via other modalities. The device 770 may be another machine or any of a wide variety of peripheral devices (e.g., a peripheral device coupled via a universal serial bus (USB)). For example, as noted above, machine 700 may correspond to any one of the client device 114, the compute service manager 108, or the execution platform 110, and the devices 770 may include the client device 114 or any other computing device described herein as being in communication with the network-based database system 102 or the cloud storage platform 104.

The various memories (e.g., 730, 732, 734, and/or memory of the processor(s) 710 and/or the storage unit 736) may store one or more sets of instructions 716 and data structures (e.g., software) embodying or utilized by any one or more of the methodologies or functions described herein. These instructions 716, when executed by the processor(s) 710, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 780 or a portion of network 780 may include a wireless or cellular network, and coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of several well-known transfer protocols (e.g., hypertext transfer protocol (HTTP)). Similarly, instructions 716 may be transmitted or received using a transmission medium via coupling 772 (e.g., a peer-to-peer coupling or another type of wired or wireless network coupling) to device 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of method 500 and method 600 may be performed by one or more processors. The performance of certain operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a method comprising: receiving, by at least one hardware processor, a database query specifying a user-defined function (UDF) to apply on one or more tables in a distributed database; identifying, by the at least one hardware processor, the one or more tables in the distributed database, the one or more tables associated with an initial set of data types native to the distributed database; converting the one or more tables to database data comprising data types of the UDF; executing, on the distributed database, the UDF on the database data to generate results data; converting the results data to table results data, the table results data associated with the initial set of data types; and storing the table results data in the distributed database.

In Example 2, the subject matter of Example 1 includes subject matter where the converting of the one or more tables comprises: mapping the initial set of data types native to the distributed database to the data types of the UDF using a mapping data store.

In Example 3, the subject matter of Example 2 includes, parsing database data of the one or more tables on a row-by-row basis to obtain a plurality of columns for each row of a plurality of rows forming the one or more tables.

In Example 4, the subject matter of Example 3 includes, converting using the mapping data store, the plurality of columns for each row of the plurality of rows to a plurality of values native to the UDF; and executing the UDF using the plurality of values, to generate the results data.

In Example 5, the subject matter of Examples 2-4 includes subject matter where the converting of the results data comprises: mapping, using a plurality of structured query language (SQL) data type to Python data type mappings in the mapping data store, the data types to the initial set of data types that are native to the distributed database.

In Example 6, the subject matter of Examples 1-5 includes, detecting the UDF includes a call to a batch application programming interface (API); and performing batch processing on the database data using the batch API to generate the results data.

In Example 7, the subject matter of Example 6 includes, the batch processing comprising: translating an initial batch of rows of the database data of the one or more tables into a plurality of data frames using a mapping data store.

In Example 8, the subject matter of Example 7 includes, executing the UDF on the plurality of data frames to generate one or both of array data and series data.

In Example 9, the subject matter of Example 8 includes, encoding one or both of the array data and the series data to generate the table results data, the table results data comprising a final batch of rows corresponding to the initial batch of rows.

In Example 10, the subject matter of Examples 6-9 includes, detecting the UDF further includes a target batch size; and performing the batch processing based on the target batch size.

Example 11 is a system comprising: at least one hardware processor; and at least one memory storing instructions that cause the at least one hardware processor to perform operations comprising: receiving a database query specifying a user-defined function (UDF) to apply on one or more tables in a distributed database; identifying the one or more tables in the distributed database, the one or more tables associated with an initial set of data types native to the distributed database; converting the one or more tables to database data comprising data types of the UDF; executing, on the distributed database, the UDF on the database data to generate results data; converting the results data to table results data, the table results data associated with the initial set of data types; and storing the table results data in the distributed database.

In Example 12, the subject matter of Example 11 includes subject matter where the operations for converting of the one or more tables comprise: mapping the initial set of data types native to the distributed database to the data types of the UDF using a mapping data store.

In Example 13, the subject matter of Example 12 includes, the operations further comprising: parsing database data of the one or more tables on a row-by-row basis to obtain a plurality of columns for each row of a plurality of rows forming the one or more tables.

In Example 14, the subject matter of Example 13 includes, the operations further comprising: converting using the mapping data store, the plurality of columns for each row of the plurality of rows to a plurality of values native to the UDF; and executing the UDF using the plurality of values, to generate the results data.

In Example 15, the subject matter of Examples 12-14 includes subject matter where the operations for converting of the results data comprise: mapping, using a plurality of structured query language (SQL) data type to Python data type mappings in the mapping data store, the data types to the initial set of data types that are native to the distributed database.

In Example 16, the subject matter of Examples 11-15 includes, the operations further comprising: detecting the UDF includes a call to a batch application programming interface (API); and performing batch processing on the database data using the batch API to generate the results data.

In Example 17, the subject matter of Example 16 includes, the operations for batch processing comprising: translating an initial batch of rows of the database data of the one or more tables into a plurality of data frames using a mapping data store.

In Example 18, the subject matter of Example 17 includes, the operations further comprising: executing the UDF on the plurality of data frames to generate one or both of array data and series data.

In Example 19, the subject matter of Example 18 includes, the operations further comprising: encoding one or both of the array data and the series data to generate the table results data, the table results data comprising a final batch of rows corresponding to the initial batch of rows.

In Example 20, the subject matter of Examples 16-19 includes, the operations further comprising: detecting the UDF further includes a target batch size; and performing the batch processing based on the target batch size.

Example 21 is a computer-storage medium comprising instructions that, when executed by one or more processors of a machine, configure the machine to perform operations comprising: receiving a database query specifying a user-defined function (UDF) to apply on one or more tables in a distributed database; identifying the one or more tables in the distributed database, the one or more tables associated with an initial set of data types native to the distributed database; converting the one or more tables to database data comprising data types of the UDF; executing, on the distributed database, the UDF on the database data to generate results data; converting the results data to table results data, the table results data associated with the initial set of data types; and storing the table results data in the distributed database.

In Example 22, the subject matter of Example 21 includes subject matter where the operations for converting of the one or more tables comprise: mapping the initial set of data types native to the distributed database to the data types of the UDF using a mapping data store.

In Example 23, the subject matter of Example 22 includes, the operations further comprising: parsing database data of the one or more tables on a row-by-row basis to obtain a plurality of columns for each row of a plurality of rows forming the one or more tables.

In Example 24, the subject matter of Example 23 includes, the operations further comprising: converting using the mapping data store, the plurality of columns for each row of the plurality of rows to a plurality of values native to the UDF; and executing the UDF using the plurality of values, to generate the results data.

In Example 25, the subject matter of Examples 22-24 includes subject matter where the operations for converting of the results data comprise: mapping, using a plurality of structured query language (SQL) data type to Python data type mappings in the mapping data store, the data types to the initial set of data types that are native to the distributed database.

In Example 26, the subject matter of Examples 21-25 includes, the operations further comprising: detecting the UDF includes a call to a batch application programming interface (API); and performing batch processing on the database data using the batch API to generate the results data.

In Example 27, the subject matter of Example 26 includes, the operations for batch processing comprising: translating an initial batch of rows of the database data of the one or more tables into a plurality of data frames using a mapping data store.

In Example 28, the subject matter of Example 27 includes, the operations further comprising: executing the UDF on the plurality of data frames to generate one or both of array data and series data.

In Example 29, the subject matter of Example 28 includes, the operations further comprising: encoding one or both of the array data and the series data to generate the table results data, the table results data comprising a final batch of rows corresponding to the initial batch of rows.

In Example 30, the subject matter of Examples 26-29 includes, the operations further comprising: detecting the UDF further includes a target batch size; and performing the batch processing based on the target batch size.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent to those of skill in the art, upon reviewing the above description.

What is claimed is:

1. A method comprising:
receiving, by at least one hardware processor, a database query specifying a user-defined function (UDF) to apply on one or more tables in a distributed database;

identifying, by the at least one hardware processor, the one or more tables in the distributed database, the one or more tables associated with an initial set of data types native to the distributed database;

converting the one or more tables to database data comprising data types of the UDF;

executing, on the distributed database, the UDF on the database data to generate results data;

converting the results data to table results data, the table results data associated with the initial set of data types; and storing the table results data in the distributed database.

2. The method of claim 1, wherein the converting of the one or more tables comprises:

mapping the initial set of data types native to the distributed database to the data types of the UDF using a mapping data store.

3. The method of claim 2, further comprising:

parsing database data of the one or more tables on a row-by-row basis to obtain a plurality of columns for each row of a plurality of rows forming the one or more tables.

4. The method of claim 3, further comprising:

converting using the mapping data store, the plurality of columns for each row of the plurality of rows to a plurality of values native to the UDF; and executing the UDF using the plurality of values, to generate the results data.

5. The method of claim 2, wherein the converting of the results data comprises:

mapping, using a plurality of structured query language (SQL) data type to Python data type mappings in the mapping data store, the data types to the initial set of data types that are native to the distributed database.

6. The method of claim 1, further comprising:

detecting the UDF includes a call to a batch application programming interface (API); and performing batch processing on the database data using the batch API to generate the results data.

7. The method of claim 6, the batch processing comprising:

translating an initial batch of rows of the database data of the one or more tables into a plurality of data frames using a mapping data store.

8. The method of claim 7, further comprising:

executing the UDF on the plurality of data frames to generate one or both of array data and series data.

9. The method of claim 8, further comprising:

encoding one or both of the array data and the series data to generate the table results data, the table results data comprising a final batch of rows corresponding to the initial batch of rows.

10. The method of claim 6, further comprising:

detecting the UDF further includes a target batch size; and performing the batch processing based on the target batch size.

11. A system comprising:

at least one hardware processor; and at least one memory storing instructions that cause the at least one hardware processor to perform operations comprising:

receiving a database query specifying a user-defined function (UDF) to apply on one or more tables in a distributed database;

identifying the one or more tables in the distributed database, the one or more tables associated with an initial set of data types native to the distributed database;

converting the one or more tables to database data comprising data types of the UDF;

executing, on the distributed database, the UDF on the database data to generate results data;

converting the results data to table results data, the table results data associated with the initial set of data types; and storing the table results data in the distributed database.

12. The system of claim 11, wherein the operations for converting the one or more tables comprise:

mapping the initial set of data types native to the distributed database to the data types of the UDF using a mapping data store.

13. The system of claim 12, the operations further comprising:

parsing database data of the one or more tables on a row-by-row basis to obtain a plurality of columns for each row of a plurality of rows forming the one or more tables.

14. The system of claim 13, the operations further comprising:

converting using the mapping data store, the plurality of columns for each row of the plurality of rows to a plurality of values native to the UDF; and executing the UDF using the plurality of values, to generate the results data.

15. The system of claim 12, wherein the operations for converting the results data comprise:

mapping, using a plurality of structured query language (SQL) data type to Python data type mappings in the mapping data store, the data types to the initial set of data types that are native to the distributed database.

16. The system of claim 11, the operations further comprising:

detecting the UDF includes a call to a batch application programming interface (API); and performing batch processing on the database data using the batch API to generate the results data.

17. The system of claim 16, the operations for batch processing comprise:

translating an initial batch of rows of the database data of the one or more tables into a plurality of data frames using a mapping data store.

18. The system of claim 17, the operations further comprising:

executing the UDF on the plurality of data frames to generate one or both of array data and series data.

19. The system of claim 18, the operations further comprising:

encoding one or both of the array data and the series data to generate the table results data, the table results data comprising a final batch of rows corresponding to the initial batch of rows.

20. The system of claim 16, the operations further comprising:

detecting the UDF further includes a target batch size; and performing the batch processing based on the target batch size.

21. A computer-storage medium comprising instructions that, when executed by one or more processors of a machine, configure the machine to perform operations comprising:

receiving a database query specifying a user-defined function (UDF) to apply on one or more tables in a distributed database;

identifying the one or more tables in the distributed database, the one or more tables associated with an initial set of data types native to the distributed database;

converting the one or more tables to database data comprising data types of the UDF;

executing, on the distributed database, the UDF on the database data to generate results data;

converting the results data to table results data, the table results data associated with the initial set of data types; and storing the table results data in the distributed database.

22. The computer-storage medium of claim 21, wherein the operations for converting the one or more tables comprise:

mapping the initial set of data types native to the distributed database to the data types of the UDF using a mapping data store.

23. The computer-storage medium of claim 22, the operations further comprising:

parsing database data of the one or more tables on a row-by-row basis to obtain a plurality of columns for each row of a plurality of rows forming the one or more tables.

24. The computer-storage medium of claim 23, the operations further comprising:

converting using the mapping data store, the plurality of columns for each row of the plurality of rows to a plurality of values native to the UDF; and executing the UDF using the plurality of values, to generate the results data.

25. The computer-storage medium of claim 22, wherein the operations for converting the results data comprise:

mapping, using a plurality of structured query language (SQL) data type to Python data type mappings in the mapping data store, the data types to the initial set of data types that are native to the distributed database.

26. The computer-storage medium of claim 21, the operations further comprising:

detecting the UDF includes a call to a batch application programming interface (API); and performing batch processing on the database data using the batch API to generate the results data.

27. The computer-storage medium of claim 26, the operations for batch processing comprise:

translating an initial batch of rows of the database data of the one or more tables into a plurality of data frames using a mapping data store.

28. The computer-storage medium of claim 27, the operations further comprising:

executing the UDF on the plurality of data frames to generate one or both of array data and series data.

29. The computer-storage medium of claim 28, the operations further comprising:

encoding one or both of the array data and the series data to generate the table results data, the table results data comprising a final batch of rows corresponding to the initial batch of rows.

30. The computer-storage medium of claim 26, the operations further comprising:

detecting the UDF further includes a target batch size; and performing the batch processing based on the target batch size.

* * * * *

UNITED STATES PATENT AND TRADEMARK OFFICE
CERTIFICATE OF CORRECTION

| | |
|---|---|
| PATENT NO. | : 11,726,976 B1 |
| APPLICATION NO. | : 18/060085 |
| DATED | : August 15, 2023 |
| INVENTOR(S) | : Brossard et al. |

It is certified that error appears in the above-identified patent and that said Letters Patent is hereby corrected as shown below:

On the Title Page

In Column 2, under item (56) "Other Publications", Line 1, delete "tensorflowjo"," and insert --tensorflow_io",-- therefor Signed and Sealed this
Third Day of December, 2024

Katherine Kelly Vidal
*Director of the United States Patent and Trademark Office*